United States Patent
Morgan et al.

(10) Patent No.: US 12,060,833 B2
(45) Date of Patent: Aug. 13, 2024

(54) GAS TURBINE ENGINE SYSTEM WITH MOTOR-GENERATOR

(71) Applicant: Rolls-Royce North American Technologies, Inc., Indianapolis, IN (US)

(72) Inventors: Sean Andrew Morgan, Indianapolis, IN (US); Timothy Unton, Indianapolis, IN (US); Alan W. Smith, Indianapolis, IN (US); Adam Lagrange, Indianapolis, IN (US); James Christopher Muskat, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 120 days.

(21) Appl. No.: 17/398,643

(22) Filed: Aug. 10, 2021

(65) Prior Publication Data
US 2023/0045973 A1 Feb. 16, 2023

(51) Int. Cl.
*F02C 7/268* (2006.01)
*F02C 6/00* (2006.01)
*F02C 6/20* (2006.01)
*F02C 9/00* (2006.01)

(52) U.S. Cl.
CPC ............... *F02C 7/268* (2013.01); *F02C 6/00* (2013.01); *F02C 6/20* (2013.01); *F02C 9/00* (2013.01)

(58) Field of Classification Search
CPC ............ F02C 7/26; F02C 7/268; F02C 7/266
See application file for complete search history.

(56) References Cited

U.S. PATENT DOCUMENTS

| | | | |
|---|---|---|---|
| 4,841,216 A | 6/1989 | Okada et al. | |
| 5,075,616 A | 12/1991 | Mitsui | |
| 5,301,500 A | 4/1994 | Hines | |
| 5,694,765 A | 12/1997 | Hield et al. | |
| 6,931,856 B2 | 8/2005 | Belokon et al. | |
| 7,253,535 B2 | 8/2007 | Duesterhoeft | |
| 7,882,691 B2 | 2/2011 | Lemmers, Jr. et al. | |

(Continued)

FOREIGN PATENT DOCUMENTS

WO 2018/211227 A1 11/2018

OTHER PUBLICATIONS

Bozhko et al., "Development of Aircraft Electric Starter-Generator System Based-On Active Rectification Technology," IEEE Transactions on Transportation Electrification, Aug. 3, 2018, 13 pp.

(Continued)

*Primary Examiner* — Gerald L Sung
(74) *Attorney, Agent, or Firm* — Shumaker & Sieffert, P.A.

(57) ABSTRACT

In some examples, a gas turbine engine including a high-pressure (HP) spool assembly including a HP shaft, a HP compressor and HP turbine; a lower pressure (LP) spool assembly including a LP shaft and LP turbine; a motor-generator coupled to the LP shaft; and a controller. The controller is configured to control the motor-generator to operate in a motor mode to apply torque the LP shaft during a starting of the HP spool assembly, and control the motor-generator to operate in a generator mode for a least a period of time following the starting of the HP spool assembly.

14 Claims, 11 Drawing Sheets

(56) References Cited

U.S. PATENT DOCUMENTS

| | | |
|---|---|---|
| 8,475,990 B2 | 7/2013 | Shishido |
| 8,584,464 B2 | 11/2013 | Joshi et al. |
| 8,776,530 B2 * | 7/2014 | Shirooni ............... F01D 25/08 |
| | | 60/779 |
| 8,935,924 B2 | 1/2015 | Takeda et al. |
| 9,045,996 B2 | 6/2015 | Anghel et al. |
| 10,263,550 B2 | 4/2019 | Thet et al. |
| 10,429,154 B2 | 10/2019 | Munevar |
| 10,676,199 B2 | 6/2020 | Hon et al. |
| 2008/0148881 A1 | 6/2008 | Moniz et al. |
| 2008/0276620 A1 | 11/2008 | Ullyott et al. |
| 2010/0065374 A1 * | 3/2010 | Szolomayer ......... F01M 11/067 |
| | | 700/282 |
| 2016/0319837 A1 | 11/2016 | Morris et al. |
| 2017/0334377 A1 | 11/2017 | Klemen et al. |
| 2017/0335710 A1 | 11/2017 | Klemen et al. |
| 2017/0335713 A1 | 11/2017 | Klemen et al. |
| 2017/0335795 A1 | 11/2017 | Klemen et al. |
| 2019/0264615 A1 * | 8/2019 | Husband ................ F02C 7/262 |
| 2021/0010384 A1 | 1/2021 | Bradley |
| 2023/0203989 A1 | 6/2023 | Morgan et al. |

OTHER PUBLICATIONS

"Starter Generator," Retrieved from https://meggittpower.com/product/starter-generator/ on Apr. 8, 2021, 3 pp.

Largue, "GE Completes First Battery-Assisted Black Start of Heavy Duty GasTurbine," https://www.powerengineeringint.com/gas-oil-fired/ge-completes-first-battery-assisted-black-start-of-a-heavy-duty-ge-gas-turbine/, Feb. 27, 2020, 2 pp.

Final Office Action from U.S. Appl. No. 17/562,571 dated Mar. 1, 2024, 26 pp.

Response to Office Action dated Nov. 21, 2023 from U.S. Appl. No. 17/562,571, filed Feb. 21, 2024, 19 pp.

Office Action from U.S. Appl. No. 17/562,571 dated Nov. 21, 2023, 26 pp.

Advisory Action from U.S. Appl. No. 17/562,571 dated May 24, 2024, 3 pp.

Response to Final Office Action dated Mar. 1, 2024 from U.S. Appl. No. 17/562,571, filed Jun. 3, 2024, 12 pp.

Response to Final Office Action dated Mar. 1, 2024 from U.S. Appl. No. 17/562,571, filed May 1, 2024, 12 pp.

* cited by examiner

GAS TURBINE ENGINE SYSTEM WITH MOTOR-GENERATOR

TECHNICAL FIELD

The present disclosure relates to gas turbine engine systems that are used, in some examples, for powered vehicles, such as aircraft.

BACKGROUND

A gas turbine engine is a type of internal combustion engine that may be used to power an aircraft, or another moving vehicle. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive a propulsor, and the propulsor may use the energy from the rotating shaft to provide propulsion for the system.

Gas turbine engine powered vehicles, such as aircraft, increasingly use electrical systems which may operate to provide auxiliary functions beyond vehicle propulsion. Electrical systems may be used to replace mechanical, hydraulic, and pneumatic drive systems in gas turbine engine powered vehicles. Gas turbine engine powered vehicles may include electrical energy generating systems to supply power for the electrical systems.

SUMMARY

The present disclosure is directed to gas turbine engine systems including multiple spools and techniques for operating the same. Examples of the gas turbine engine systems may include a high-pressure (HP) spool and at least one other lower pressure (LP) spool (e.g., a low-pressure spool and/or an intermediate pressure spool). The gas turbine engine may include a motor-generator coupled to the shaft of the LP spool. The motor-generator may be operated in a generator mode to generate power from the rotation of the LP shaft following the start-up of the gas turbine engine (e.g., where the LP shaft is driven by a turbine of the LP spool). Conversely, in conjunction with the starting of the HP spool, e.g., using a starter, the motor-generator may operate in a motor mode to apply a torque to the LP shaft, e.g., to drive rotation of the LP shaft separately from the HP shaft during the starting of the HP shaft.

In some examples, the present disclosure is directed to a gas turbine engine system comprising: a high-pressure (HP) spool assembly including a HP shaft, a HP compressor and HP turbine; a lower pressure (LP) spool assembly including a LP shaft and a LP turbine; a motor-generator coupled to the LP shaft; and a controller configured to: control the motor-generator to operate in a motor mode to apply torque the LP shaft during starting of the HP spool assembly, and control the motor-generator to operate in a generator mode for a least a period of time following the starting of the HP spool assembly.

In some examples, the present disclosure is directed to a method for operating a gas turbine engine, the engine comprising a high-pressure (HP) spool assembly including a HP shaft, a HP compressor and HP turbine; a lower pressure (LP) spool assembly including a LP shaft and a LP turbine; a motor-generator coupled to the LP shaft; and a controller; the method comprising: controlling the motor-generator to operate in a motor mode to apply torque to the LP shaft during starting of the HP spool assembly, and controlling the motor-generator to operate in a generator mode for a least a period of time following the starting of the HP spool assembly.

The details of one or more examples are set forth in the accompanying drawings and the description below. Other features, objects, and advantages will be apparent from the description and drawings, and from the claims.

DETAILED DESCRIPTION

Figure 1:
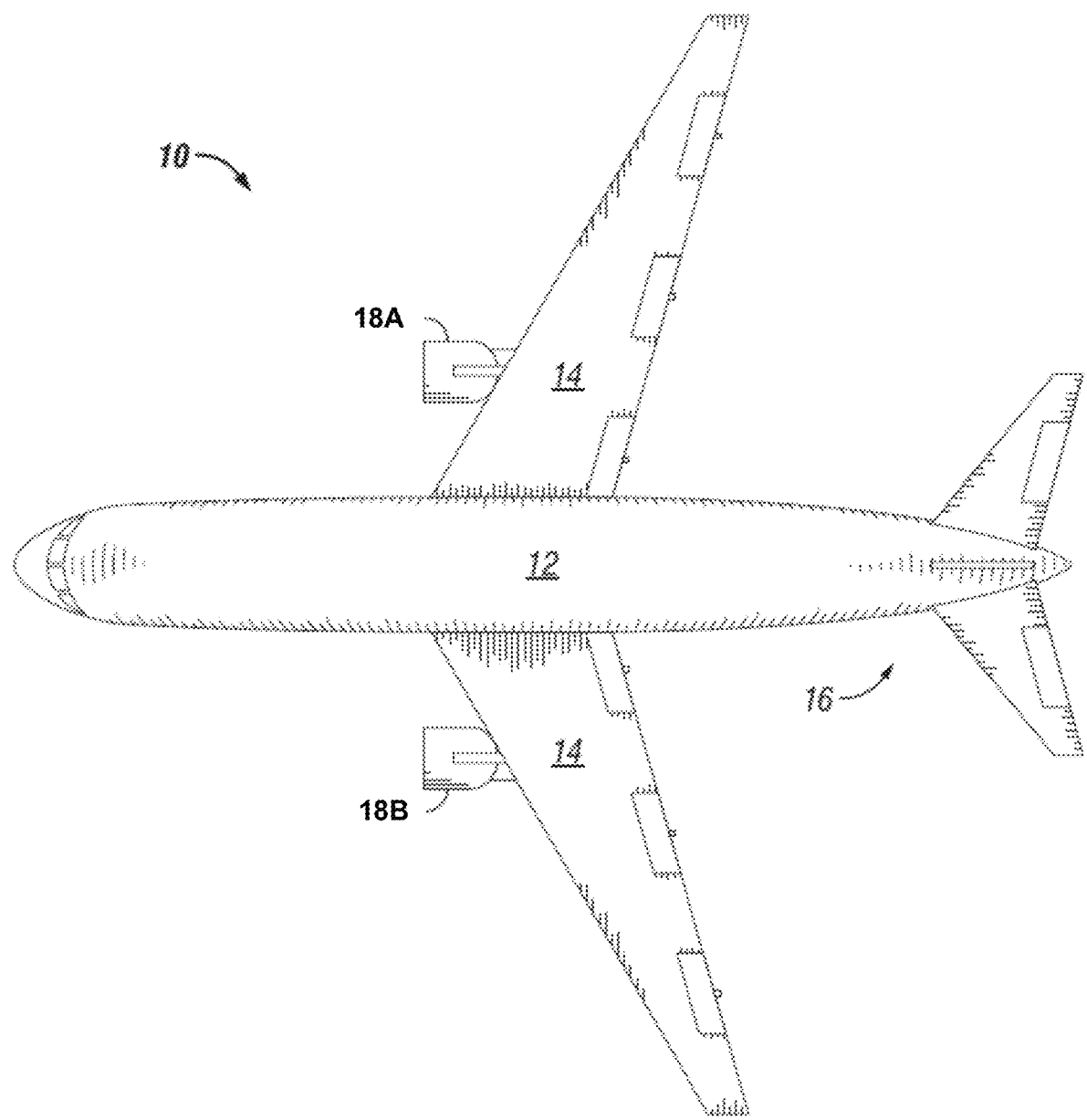
FIG. 1 is a conceptual diagram illustrating an example vehicle in accordance with an example of the present disclosure.

The present disclosure is directed to gas turbine engine systems, e.g., for gas turbine engine powered vehicles such an aircraft, and techniques for operating the same. For ease of description, examples of the disclosure will be primarily described in the context of aircraft as a gas turbine engine powered vehicle. However, examples of the disclosure are not limited to aircraft.

Gas turbine engine powered aircraft increasingly require significant amount of additional power beyond that generated by the one or more gas turbine engines used by the aircraft for main propulsion. In some examples, electrical systems may be used to replace mechanical, hydraulic, and pneumatic drive systems in gas turbine engine powered vehicles, while also providing one or more auxiliary functions to the aircraft not directly related to propulsion. Those electrical systems may increase the electrical load requirements for the vehicle.

Electric machines that function as electric generators may be employed by gas turbine combustion engine power aircraft to satisfy the transient and/or continuous electrical loads associated with the electrical system(s). For example, a gas turbine engine having a low-pressure spool and high-pressure spool may include an electric generator that generates electricity from the rotation of the low-pressure spool shaft. The electrical power extracted from the low-pressure spool shaft may be used to supply power to various aircraft systems (e.g., electrical systems of the vehicle system that require electrical energy to operate, such as aircraft anti-ice heating, weapon systems, navigation systems including radar, environmental cooling systems (ECS)).

The present disclosure is directed to gas turbine engine systems including multiple spools and techniques for operating the same. Examples of the gas turbine engine systems may include a high-pressure (HP) spool and at least one other lower pressure (LP) spool (e.g., a low-pressure spool and/or an intermediate pressure spool). The gas turbine engine may include a motor-generator coupled to the shaft of the LP spool. In conjunction with the starting of the HP spool, e.g., using a starter, the motor-generator may operate in a motor mode to apply a torque to the LP shaft, e.g., to drive rotation of the LP shaft separately from the HP shaft during the starting of the HP shaft. Conversely, the motor-generator may be operated in a generator mode to generate power from the rotation of the LP shaft following start-up of the gas turbine engine (e.g., where the LP shaft is driven by a turbine of the LP spool).

In some examples, the rotation of the LP shaft by the motor-generator may drive an oil scavenge device during the HP spool starting process to remove oil that is supplied from an oil pump driven by the HP shaft. This operation may coordinate the starting of the scavenge system with the starting of the oil system to prevent oil flooding and/or undesired effects that may result from a delay between the starting of the scavenge device and the starting of the oil system driven by the HP shaft.

Additionally, or alternatively, during the staring of the gas turbine engine system, the motor-generator may be configured to apply a torque to the LP shaft to overcome cogging torque associated with the motor-generator, e.g., to reduce delay between the starting of the LP shaft rotation relative to the starting of the HP shaft rotation. Additionally, or alternatively, the motor-generator may be configured to apply a torque to the LP shaft to check for rotor lock prior to starting of the HP shaft. Additionally, or alternatively, during starting and/or after the starting of the HP spool, the motor-generator may be operated as a motor to modify the rotational speed of the LP shaft when undesirable vibrations of the engine are sensed.

FIG. 1 is a conceptual diagram illustrating an example vehicle in accordance with an example of the present disclosure. In the example of FIG. 1, the vehicle includes an aircraft 10. In other examples, the vehicle may include any type of gas turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, two gas turbine engine systems 18A and 18B (collectively, "gas turbine engines 18") as main propulsion engines. In other examples, aircraft 10 may include a single gas turbine engine 18 or a plurality of propulsion systems 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft. Aircraft 10 may employ any number of wings 14. Empennage 16 may employ a single or multiple flight control surfaces. Gas turbine engines 18 may be the main propulsion systems of aircraft 10.

In accordance with some examples of the disclosure, one or both of gas turbine engine systems 18A and 18B may include a HP spool, one or more lower pressure (LP) spools (e.g., a single low-pressure spool or a low-pressure spool and intermediate pressure (IP) spool), and a motor-generator coupled to a shaft of a lower pressure (LP) spool. The systems may be configured to operate the motor-generator in a generator mode to generate power from the rotation of the LP shaft and, conversely, to operate the motor-generator in a motor mode to selectively apply a torque to the LP shaft, e.g., during starting of the HP spool. In the motor mode, the motor-generator may apply a directed load or directed resistance on the LP shaft to generally change the response of the gas turbine engine as described herein.

Figure 2A:
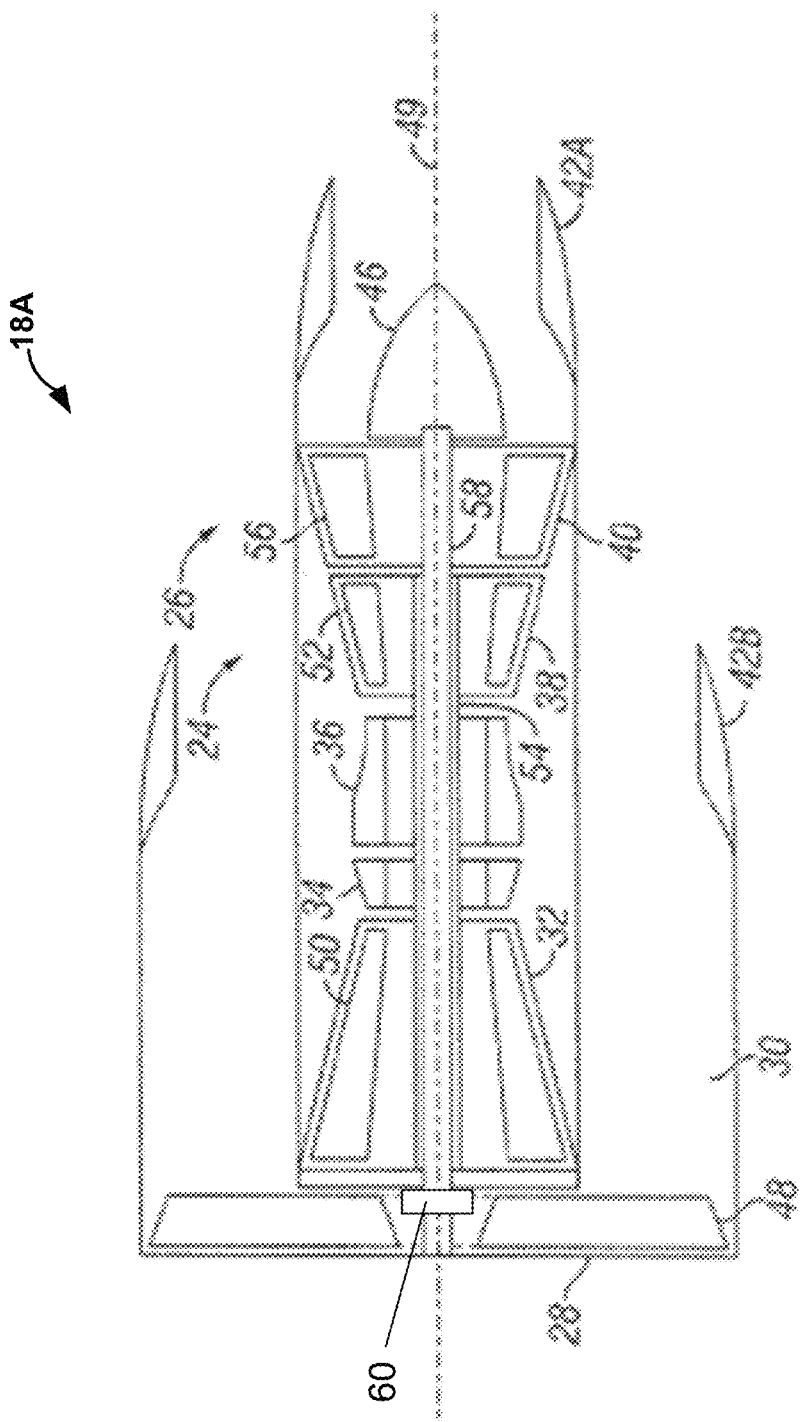
FIGS. 2A-2D are conceptual diagrams illustrating various example gas turbine engine system.

FIG. 2A is a conceptual and schematic diagram illustrating gas turbine engine system 18A in accordance with an example of the present disclosure. Although described herein as with respect to an aircraft propulsion system, in other examples, gas turbine engine 18A may be a propulsion system for providing propulsive thrust to any type of gas turbine engine powered vehicle, as discussed above, or configured to provide power any suitable nonvehicle system including gas turbine engine 18A. Engine 18B may be the same or similar to engine 18A in FIG. 1.

Engine 18A may be a primary propulsion engine that provides thrust for flight operations of aircraft 10. In the example of FIG. 2A, engine 18A is a two spool engine having a high-pressure (HP) spool (rotor) 24 and a low-pressure spool (rotor) 26. In other embodiments, engine 20 may include only a single spool, or may include three or more spools, e.g., may include an intermediate pressure (IP) spool and/or other spools and/or partial spools, e.g., on-axis or off-axis compressor and/or turbine stages (i.e., stages that rotate about an axis that is the same or different than that of the primary spool(s)). In one form, engine 18A is a turbofan engine. In other embodiments, engine 18A may be any other type of gas turbine engine, such as a turboprop engine, a turboshaft engine, a propfan engine, a turbojet engine or a hybrid or combined cycle engine. As a turbofan engine, low-pressure spool 26 is operative to drive a propulsor 28 in the form of a turbofan (fan) system, which may be referred to as a turbofan, a fan, or a fan system. As a turboprop engine, low-pressure spool 26 powers a propulsor 28 in the form of a propeller system (not shown), e.g., via a reduction gearbox (not shown). In other embodiments, propulsor 28 may take other forms, such as one or more helicopter rotors or tilt-wing aircraft rotors, for example, powered by one or more engines 18A in the form of one or more turboshaft engines.

In one form, engine 18A includes, in addition to fan 28, a bypass duct 30, a high-pressure (HP) compressor 32, a diffuser 34, a combustor 36, a high-pressure (HP) turbine 38, a low-pressure turbine 40, a nozzle 42A, a nozzle 42B, and a tailcone 46, which are generally disposed about and/or rotate about an engine centerline 49. In other embodiments, there may be, for example, an intermediate pressure spool having an intermediate pressure turbine or other turbomachinery components, such as those mentioned above. In one form, engine centerline 49 is the axis of rotation of fan 28, HP compressor 32, HP turbine 38 and turbine 40. In other embodiments, one or more of fan 28, HP compressor 32, HP turbine 38 and turbine 40 may rotate about a different axis of rotation.

In the depicted example, engine 18A core flow is discharged through nozzle 42A, and the bypass flow from fan 28 is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and HP compressor 32 are in fluid communication with fan 28. Nozzle 42B is in fluid communication with bypass duct 30. Diffuser 34 is in fluid communication with HP compressor 32. Combustor 36 is fluidly disposed between HP compressor 32 and HP turbine 38. Turbine 40 is fluidly disposed between HP turbine 38 and nozzle 42A. In one form, combustor 36 includes a combustion liner (not shown) that contains a continuous combustion process. In other embodiments, combustor 36 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Fan system 28 includes a fan rotor system 48 driven by low-pressure spool 26. In various examples, fan rotor system 48 may include one or more rotors (not shown) that are powered by turbine 40. In various embodiments, fan 28 may include one or more fan vane stages (not shown in FIG. 2A) that cooperate with fan blades (not shown) of fan rotor system 48 to compress air and to generate a thrust-producing flow. Bypass duct 30 is operative to transmit a bypass flow generated by fan 28 around the core of engine 18A. HP compressor 32 includes a compressor rotor system 50. In various examples, compressor rotor system 50 includes one or more rotors (not shown) that are powered by HP turbine 38. HP compressor 32 also includes a plurality of compressor vane stages (not shown in FIG. 2A) that cooperate with compressor blades (not shown) of compressor rotor system 50 to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages.

HP turbine 38 includes a turbine rotor system 52. In various embodiments, turbine rotor system 52 includes one or more rotors having turbine blades (not shown) operative to extract power from the hot gases flowing through HP turbine 38 (not shown), to drive compressor rotor system 50. HP turbine 38 also includes a plurality of turbine vane stages (not shown) that cooperate with the turbine blades of turbine rotor system 52 to extract power from the hot gases discharged by combustor 36. In one form, the turbine vane stages are stationary. In other embodiments, one or more vane stages may be replaced with one or more counter-rotating blade stages. Turbine rotor system 52 is drivingly coupled to compressor rotor system 50 via a shafting system 54 (also referred to as high-pressure (HP) shaft 54). Turbine 40 includes a turbine rotor system 56. In various embodiments, turbine rotor system 56 includes one or more rotors having turbine blades (not shown) operative to drive fan rotor system 48. Turbine 40 may also include a plurality of turbine vane stages (not shown in FIG. 2A) that cooperate with the turbine blades of turbine rotor system 56 to extract power from the hot gases discharged by HP turbine 38. In one form, the turbine vane stages are stationary. In other embodiments, one or more vane stages may be replaced with one or more counter-rotating blade stages. Turbine rotor system 56 is drivingly coupled to fan rotor system 48 via shafting system 58 (also referred to as low-pressure shaft 58). In various embodiments, shafting systems 54 and 58 include a plurality of shafts that may rotate at the same or different speeds and directions for driving fan rotor system 48 rotor(s) and compressor rotor system 50 rotor(s). For ease of description, shafting system 54 of HP spool 24 is described primarily as HP shaft 54 but is it recognized that system 54 is not limited to a single shaft. Likewise, shafting system 58 of low-pressure spool 26 is described primarily as low-pressure shaft 58 but is it recognized that system 58 is not limited to a single shaft. Turbine 40 is operative to discharge the engine 20 core flow to nozzle 42A.

During normal operation of gas turbine engine 18A, air is drawn into the inlet of fan 28 and pressurized. Some of the air pressurized by fan 28 is directed into HP compressor 32 as core flow, and some of the pressurized air is directed into bypass duct 30 as bypass flow. HP compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive HP compressor 32 and fan 28 via respective HP shaft 54 and low-pressure shaft 58. The hot gases exiting turbine 40 are discharged through nozzle system 42A, and provide a component of the thrust output by engine 20.

As shown in FIG. 2A, engine 18A includes motor-generator 60. In the illustrated example, motor-generator 60 is positioned between fan system 48 and HP compressor 32 along centerline 49. Motor-generator core 60 may include any suitable type and/or arrangement of electro-mechanical motor and/or generator. Example of suitable motor-generators 60 may include one or more of the examples of the motor-generator and motor generator assemblies disclosed within U.S. patent application Ser. Nos. 15/590,623; 15/590,606; 15/590,581; and Ser. No. 15/590,554, filed May 9, 2017 and the example electrical machines describes in U.S. patent application Ser. No. 15/135,167 filed Dec. 19, 2013. The entire content of these applications are incorporated by reference herein. As discussed in additional detail below, the motor-generator 60 may be selectively operated to extract and/or provide power to the low-pressure shaft 58. For example, motor-generator 60 may be configured for selective operation between a generation mode to generate electrical power from rotation of the low-pressure turbine 40 and in a drive mode to receive electrical power for applying rotational force to the low-pressure shaft 58.

In the example of FIG. 2A as well as the other examples turbine engine systems described herein, motor-generator 60 may be an embedded electrical machine in that the stator and rotor of electrical machine core are positioned coaxially with low-pressure shaft 58. The stator of motor-generator 60 may be fixed against rotation relative to the low-pressure shaft 58 and a rotor may be coupled to the low-pressure shaft 58 for rotation therewith. The rotor may be attached to a mount of the low-pressure shaft 58 positioned axially between shaft bearings of the low-pressure shaft 58. The stator may include a number of stator windings positioned radially outward of the rotor, such that each stator winding is arranged in electromagnetic communication with the rotor 44. In other examples, motor-generator 60 may include a stator and rotor positioned non-coaxially, e.g., where the rotor of motor-generator 60 is rotationally coupled to low-pressure shaft 32 via one or more other shafts and suitable gearing.

Figure 2B:
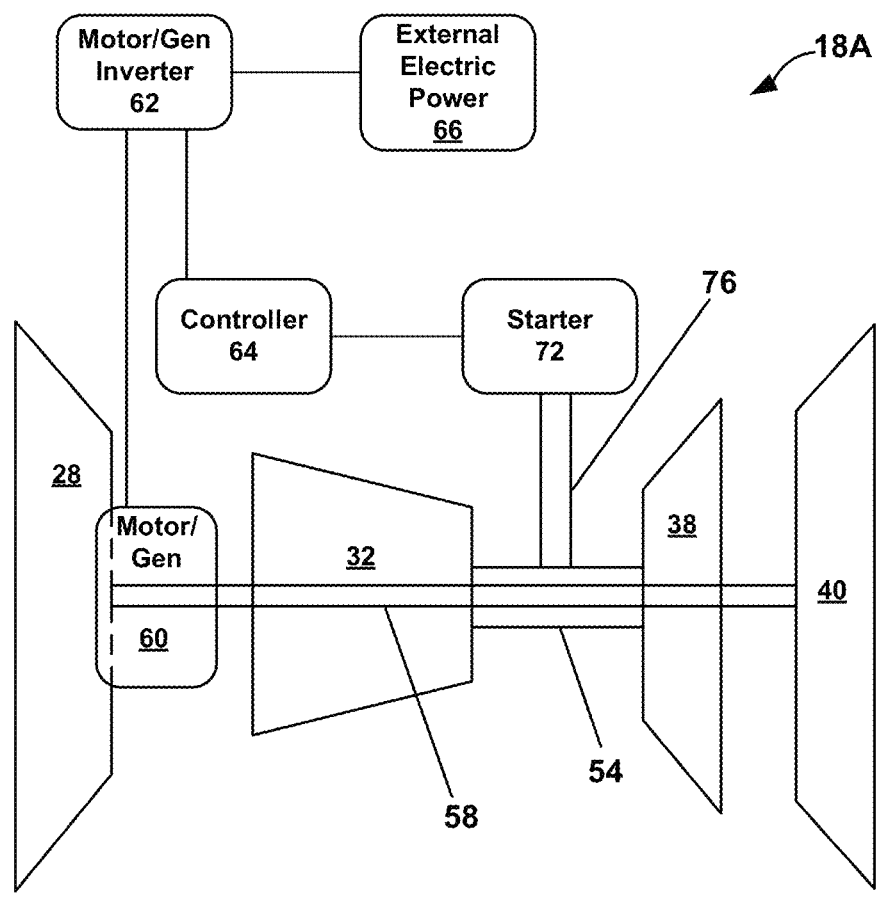

FIG. 2B is a schematic functional diagram illustrating additional components of engine system 18A of FIGS. 1 and 2A, and like features are similarly numbered. As noted above, engine system 18A may be a gas turbofan system. Engine 18A may include fan rotor system 28 that is rotationally coupled to low-pressure turbine 40 by low-pressure shaft 58, and HP compressor 32 rotationally coupled to HP turbine 38 by HP shaft 54. The speed of shaft 54 driving the HP compressor 32 may be different from that of the speed of shaft 58 driving the fan rotor system 28. The combination of HP compressor 32, HP turbine 38 and HP shaft 54 may be referred to as the HP spool assembly 24 or HP spool 24. The combination of fan system 28, low-pressure turbine 40 and low-pressure shaft 58 may be referred to as the low-pressure spool assembly 26 or low-pressure spool 26.

Engine system 18A also includes motor-generator 60, motor-generator inverter 62, controller 64, external electric power 66, and starter 72. Controller 64 may include control circuitry the implements control of engine system 18A. Controller 64 may be configured to control the components of system 18A individually and selectively such that system 18A implements the techniques described herein. Controller 64 may comprise any suitable arrangement of hardware, software, firmware, or any combination thereof, to perform the techniques attributed to controller 64 herein. Examples of controller 64 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 64 includes software or firmware, controller 64 further includes any necessary hardware for storing and executing the software or firmware, such as one or more processors or processing units. In some examples, all or portions of controller 64 may be embodied in a full authority digital engine control (FADEC) including an electronic engine controller (EEC) or engine control unit (ECU) and related accessories that control one or more aspects of the operation of engine system 18A.

In general, a processing unit may include one or more microprocessors, DSPs, ASICs, FPGAs, or any other equivalent integrated or discrete logic circuitry, as well as any combinations of such components. Although not shown in FIG. 2B, controller 64 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 64 (e.g., may be external to a package in which controller 64 is housed).

Although controller 64 is generally described as being the primary unit for controlling each of the components of system 18A for performing the techniques described herein, in some examples, the individual components of system 18A may include additional functionality for performing some or all of the operations described below with respect to controller 64. For example, a combination of one or more of HP compressor 32, turbines 38, 40, fan system 28, motor-generator 60, motor-generator inverter 62, starter 72, and the like may include components for controlling the operation of system 18A in the manner described herein.

Starter 72, under the controller of controller 64, may be configured to start engine 18A by starting HP spool 24, e.g., by applying a torque to HP shaft 54 to initiate the rotation HP compressor 32. Any suitable starter assembly may be employed for starter 72 including, e.g., a direct current (DC) electric motor, starter motor-generator, and the air turbine type of starters. In the example shown, starter 72 may rotate shaft 76 which is rotationally coupled to HP shaft 54 to drive the rotation of HP compressor 32 during starting of HP spool 24 to start engine 18A. In some examples, to start gas turbine engine 18A, the rotation of HP compressor 32 may be accelerated by starter 72 to provide sufficient air to support combustion in the combustion section. Once ignition and fuel has been introduced and the lite-off has occurred, starter 72 may continue to assist engine system 18A until the engine reaches a self-sustaining speed. The torque supplied by starter 72 may be in excess of the torque required to overcome compressor 32 inertia and the friction loads of compressor 32. When starter 72 has accelerated compressor 32 sufficiently to establish airflow through the engine, the ignition is turned on followed by the fuel.

As described herein, motor-generator 60, under the control of controller 64 using motor/generator inverter 62, is configured to be selectively operated in a motor mode in which motor-generator 60 may be controlled to apply torque to low-pressure shaft 58, and also a generator mode in which motor-generator 60 is controller to generate power from the rotation of shaft 58, e.g., as driven by turbine 40. As shown in the example of FIG. 2B, system 18A includes motor-generator inverter 62 and external electric power 66, which provides the electrical power to the LP generator in motor mode during the starting of HP spool 24.

The electrical energy generated by motor-generator 60 in a generator mode may be used to provide operational power to one or more electrically operated systems of vehicle 10 (FIG. 1). In some examples, motor-generator 60 may be configured to generate continuous aircraft or transient system power also defined by the desired end user application. Example electrical systems that may be powered by motor-generator 60 include hydraulic and/or pneumatic drive systems, environmental control systems, communications systems, directed energy systems, radar systems and component cooling systems.

Motor-generator 60, under the control of controller 64 using motor/generator inverter 62, may be operated in a motor mode to apply torque as an electric motor to shaft 58. The torque applied by motor-generator 60 may drive the rotation, alone or in combination with another applied torque, to low-pressure shaft 58. Alternatively, the torque applied by motor-generator 60 may be a resistive torque that resists the rotation of low-pressure shaft 58. The amount of torque applied by motor-generator 60 may be controlled by motor/generator inverter 62, e.g., based on the desired acceleration or deceleration of low-pressure shaft 58.

Figure 2C:
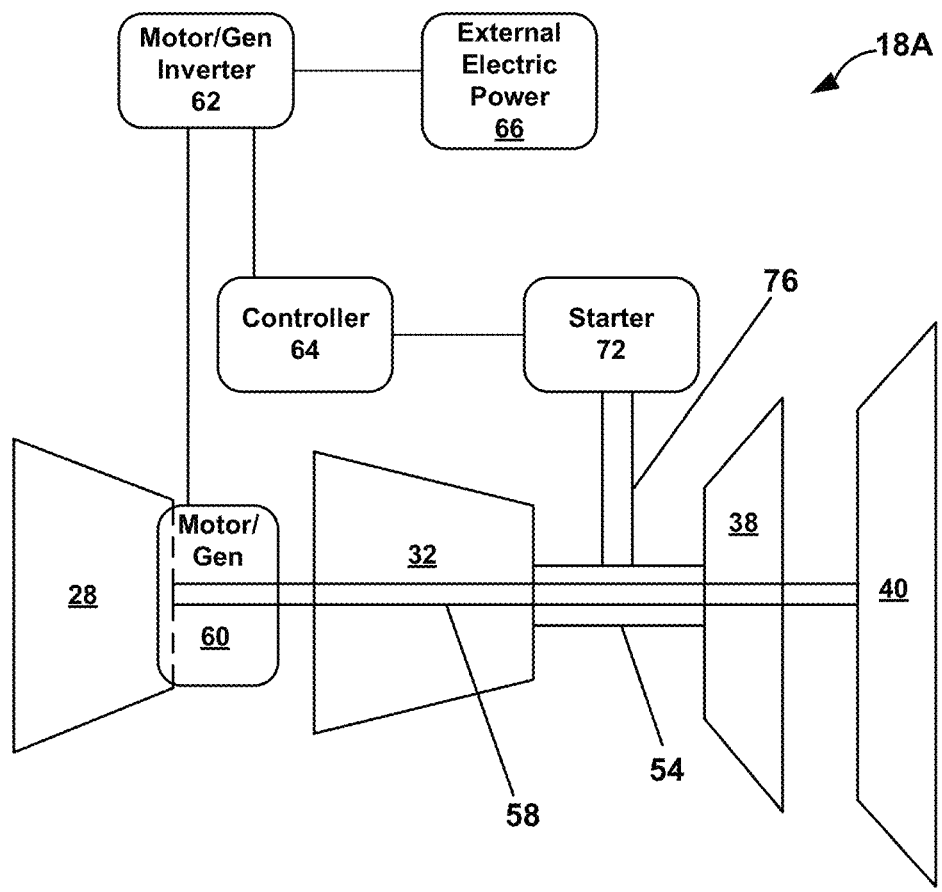

FIG. 2C is a schematic functional diagram illustrating another example of engine 18A in FIG. 1. Engine 18A in the example of FIG. 2C may be substantially similar to that of the examples of FIG. 2B, and like features are similarly numbered. However, in the example of FIG. 2C, engine 18A may be a gas turbojet system compared to a gas turbofan system such as that shown in FIGS. 2A and 2B. LP shaft 58 in the example of FIG. 2C drives fan 28 but there is not bypass like that in FIGS. 2A and 2B so substantially all the intake air passes through the core.

Figure 2D:
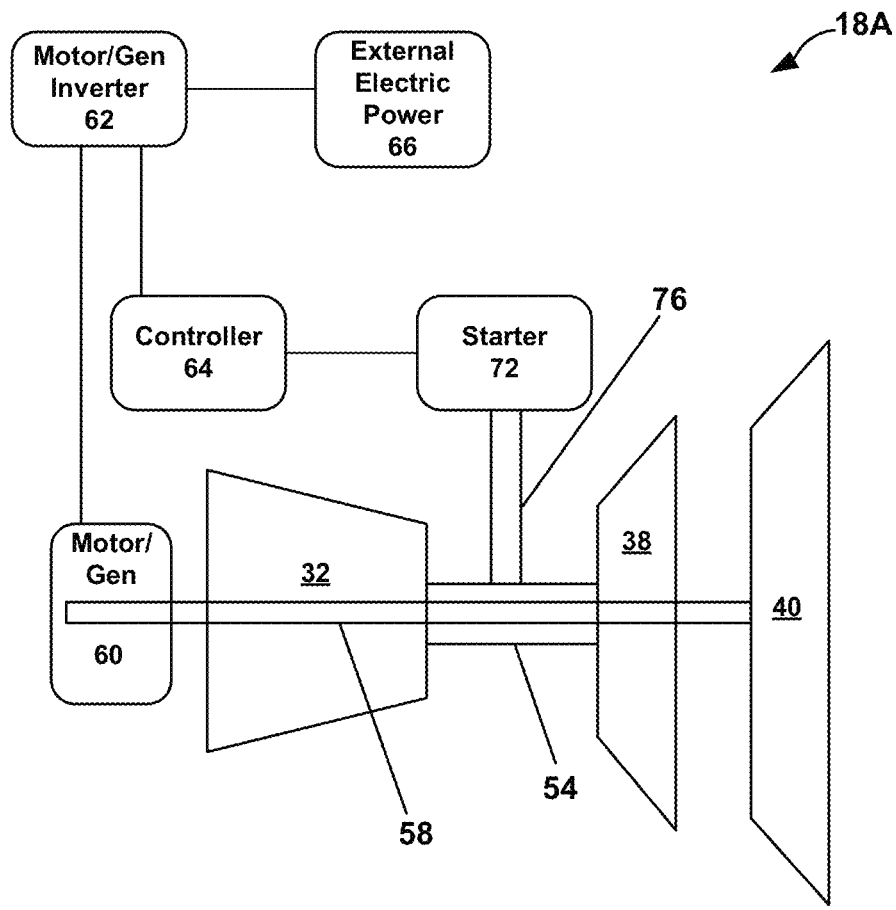

FIG. 2D is a schematic functional diagram illustrating another example of engine 18A in FIG. 1. Engine 18A in the example of FIG. 2D may be substantially similar to that of the examples of FIGS. 2B and 2C, and like features are similarly numbered. However, in the example of FIG. 2D, engine 18A may be a gas turboshaft system. In such an example, LP shaft 58 may drive one or more propulsor rotors (not shown) such as helicopter rotors or tilt wing aircraft rotors.

Figure 3A:
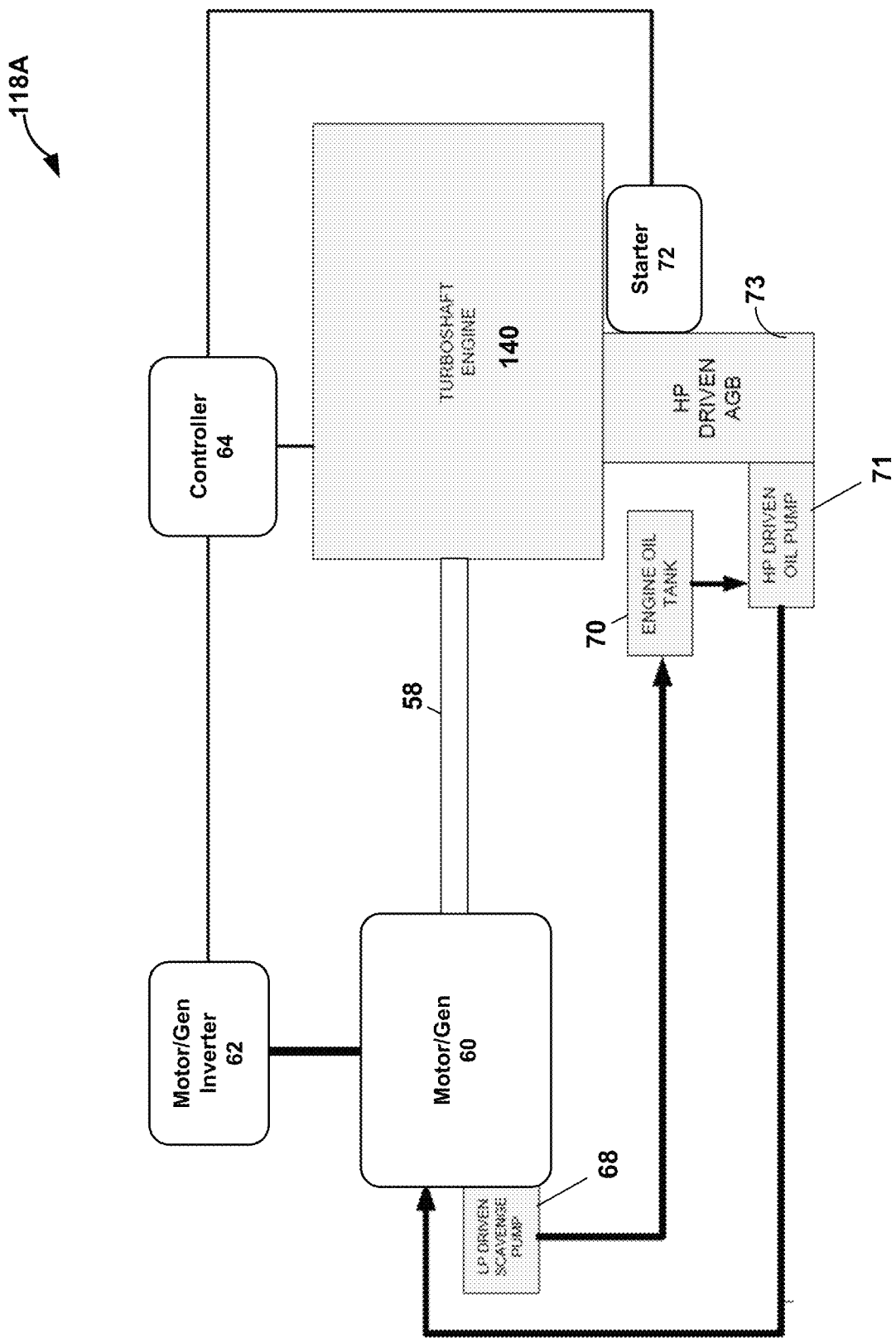
FIGS. 3A and 3B are schematic conceptual diagrams illustrating an example turboshaft engine system and an example turboprop engine system, respectively.

FIG. 3A is a schematic functional diagram illustrating an example gas turbine engine system 118A in accordance with some examples of the disclosure. Engine system 118A may be an example turboshaft engine system such as the example of FIG. 2D, and like features are similarly numbered. System 118A includes turboshaft engine 140. Turboshaft engine 140 may be a multiple spool engine such as the example of FIG. 2D. Although not shown individually in FIG. 3A, turboshaft engine 140 may include a HP spool assembly and a lower pressure spool assembly such as those described above. The HP spool assembly may include HP shaft 54, HP turbine 38, and HP compressor 32 like that shown in FIG. 2D. The lower pressure spool assembly may include low-pressure shaft 58 and lower pressure turbine 40 like that shown in FIG. 2D. The low-pressure shaft 58 may drive propulsor rotor(s) such as helicopter rotor(s) or tilt-wing aircraft rotor(s). Put another way, turboshaft engine 140 may include HP compressor 32, HP turbine 38, HP shaft 54, low pressure turbine 40, and shaft 76 shown in FIG. 2C except that shaft 76 is driven out of gearbox 73 in FIG. 3A.

Starter 72, under the controller of controller 64, may be configured to start engine 140 by starting the HP spool assembly, e.g., by applying a torque to HP shaft 54 to initiate the rotation HP compressor 32. Any suitable starter assembly may be employed for starter 72 including, e.g., a direct current (DC) brushed electric motor, a permanent magnet starter motor-generator, a field wound electric starter generator and the air turbine type of starters. In the example shown, starter 72 may rotate shaft 76 which is rotationally coupled to HP shaft 54 to drive the rotation of HP compressor 32 during starting of the HP spool assembly to start engine 18A. In some examples, to start engine 140, the rotation of HP compressor 32 may be accelerated by starter 72 to provide sufficient air to support combustion in the combustion section. Once ignition and fuel has been introduced and the lite-off has occurred, starter 72 may continue to assist engine 140 until the engine reaches a self-sustaining speed. The torque supplied by starter 72 may be in excess of the torque required to overcome compressor 32 inertia and the friction loads of compressor 32. When starter 72 has accelerated compressor 32 sufficiently to establish airflow through the engine, the ignition is turned on followed by the fuel.

System 118A also includes an oil supply system that includes an engine oil tank 70 and a HP driven oil pump 71, as well as an oil scavenge device in the form of a low-pressure shaft driven scavenge pump 68. Oil pump 71 is driven by the rotation of HP shaft 54 through HP driven auxiliary gear box (AGB) 73 while scavenge pump 68 is driven by the rotation of low-pressure shaft 58.

Engine oil tank 70 may contain a supply of oil (e.g., in an oil tank or reservoir) that is supplied to one or more components of system 118A including motor-generator 60 by HP driven oil pump 71. For example, oil pump 70 may pump oil from oil tank 70 to supply motor-generator 60 and/or other components of system 118A with lubricating oil. Scavenge pump 68 collects oil supplied by HP driven pump 71 to motor-generator 60 and/or other components of system 118A for lubrication or otherwise, and returns to the oil to oil tank 70, e.g., as a part of recirculatory system. As noted in FIG. 3A, the operation of scavenge pump 68 is driven by lower power shaft 58 of the low-pressure spool (e.g., via suitable gearing). For example, oil pump 68 pumps oil to oil tank 70 from motor-generator 60 when low-pressure shaft 58 is rotating. Conversely, scavenge pump 68 may not operate to remove oil supplied from oil tank 70 by pump 71 when low-pressure shaft 58 is not rotating or rotating at a speed below a threshold value. In some instances, motor-generator 60 may be operated in a motor mode to drive low-pressure shaft 58 during the starting of engine 140 so that scavenge pump 68 operates during the starting process and in coordination with the operation of oil pump 71, e.g., to allow for scavenge pump 68 to recirculate oil to tank 70 during the starting process.

As described herein, motor-generator 60, under the control of controller 64, is configured to be selectively operated in a motor mode in which motor-generator 60 may be controlled to apply torque to low-pressure shaft 58, and also a generator mode in which motor-generator 60 is controller to generate power from the rotation of shaft 58, e.g., as driven by turbine 40. As shown in the example of FIG. 3A, system 18A includes motor-generator inverter 62 and external electric power 66, which provides the electrical power to the LP generator in motor mode during the starting of the HP spool assembly.

As one example, motor-generator 60 may operate in a motor mode during the starting of the HP spool assembly by starter 72 so that the rotation of low-pressure shaft 58 is driven in coordination with the rotation of HP shaft 54, as separately driven by starter 72. In the absence of torque being applied by motor-generator 60 in a motor mode during the starting of The HP spool assembly by starter 72, the rotation of low-pressure shaft 58 may be delayed compared to that of shaft 54 of the HP spool assembly. For example, during the starting process without using the motor-generator 60 in a motor mode, the rotation of low-pressure shaft 58 may not begin until there is sufficient LP rotor aerodynamic torque providing by the HP rotor to overcome the LP rotor friction torque, engine drag and cogging torque. Thus, the rotation of low-pressure shaft 58 may be temporarily delayed relatively to the starting of shaft 54 rotation when the HP spool assembly is started by starter 72.

However, by using motor-generator 60 in a motor mode to apply a torque to low-pressure shaft 58 during the starting of the HP spool assembly by starter 72, the rotation of low-pressure shaft 58 begins may be better coordinated with the rotation of HP shaft 54. In some examples, controller 64, using inverter 62, may control motor-generator 60 to apply a torque that starts the rotation of the low-pressure shaft 58 sooner than the rotation of low-pressure shaft 58 would begin without the use of motor-generator 60.

Figure 4:
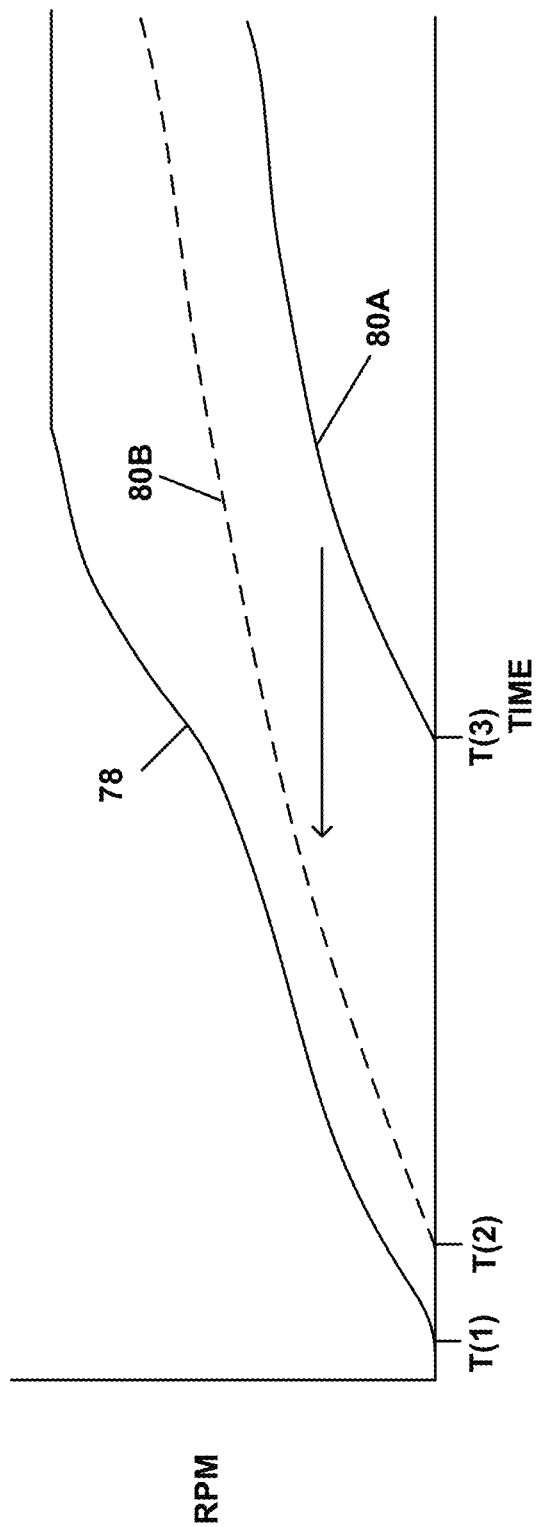
FIG. 4 is a plot of rotation per minute versus time for example HP spool and LP spool shafts for two different scenarios.

FIG. 4 is a plot of rotation per minute (RPM) versus time for two different scenarios. The plot shows the rotation of HP shaft 54 during the starting of the HP spool assembly with starter 72 (labelled as "78" in FIG. 4) as well as 1) a first scenario in with the low-pressure shaft 58 is rotated without motor-generator 60 applying a torque (labelled as "80A") and 2) a second scenario in which motor-generator 60 operates in a motor mode during the starting of the HP spool assembly by starter 72 to apply a torque to low-pressure shaft 58 during the starting of the HP spool assembly to drive the rotation of the low-pressure shaft (labelled as "80B"). As shown, in both the first and second scenario, the HP shaft 54 begins to rotate at time T(1). In the first scenario, the rotation of low-pressure shaft 58 is delayed relative to the HP shaft 54 with the rotation of shaft 58 not beginning until time T(3). Conversely, in the second scenario, controller 64 may command motor/generator inverter 62 to control the timing and amount of torque applied by motor-generator 60 to low-pressure shaft 58 during the starting of the HP spool assembly so the low-pressure shaft 58 rotation begins at time T(2), which is closer in time to T(1) compared to the first scenario. In some examples, controller 64 may command motor/generator inverter 62 to operate motor-generator 60 to apply torque to low-pressure shaft 58 such that T(1) and T(2) in FIG. 4 are approximately equal.

Additionally, or alternatively, controller 64 may command motor/generator inverter 62 to control the timing and/or amount of torque applied by motor-generator 60 to low-pressure shaft 58 to adjust (e.g., increase or decrease) the rate at which low-pressure shaft 58 rotates during the starting of the HP spool assembly by starter 72. For example, controller 64 may command motor/generator inverter 62 to control motor-generator 60 to increase the rate of rotation of low-pressure shaft 58 may adjust the rate at which low-pressure shaft 58 rotates during the starting of the HP spool assembly by starter 72. This increase in rate of rotation may be used to accelerate the time at which scavenge pump 68 begins operation so that scavenge pump 68 removes/recirculates oil supplied by oil pump from oil tank 70 when oil pump 71 begins operating with the starting of the HP spool assembly by starter 72.

In some examples, the earlier starting and/or accelerated rotation of low-pressure shaft 58 during the starting of the HP spool assembly may allow for oil scavenge pump 68 to start recycling oil supplied from oil tank 70 by pump 71 (which may begin supplying oil when the HP spool assembly begins rotating or reaches some threshold minimum RPM) sooner since oil scavenge pump 68 is driven by shaft 58. This may prevent oil loss, reduce emission and/or flooding of oil in system 118A from the oil supplied by oil pump 70 in cases in which oil pump 70 begins operating earlier than scavenge pump 68 (e.g., compared to cases in which motor-generator 60 is not employed to initiate the rotation and/or adjust the rotational speed of LP shaft 58 by applying a torque to LP shaft 58 during starting of the HP spool assembly by starter 72).

In some examples, motor-generator 60 may control low-pressure shaft 58 to the minimum speed to ensure adequate scavenge capability with scavenge pump 68 and also ensure that speed is set to avoid low-pressure shaft/rotor resonances. As the HP shaft 54 speed increases, the aerodynamic torque for the low-pressure shaft/rotor 58 increases rapidly. Controller 64 may control engine system 118A to a low-pressure rotor speed minimum limit with inverter 62 in a speed control mode. This may allow the low-pressure motor torque and power to back off gradually as the aerodynamic torque driving the LP rotor increases. Inverter 62 may also ensure a minimum low-pressure rotor speed is maintained as required to drive the LP driven scavenge pump 68. The minimum low-pressure speed may be derived as a function of the HP shaft speed during the start to ensure the scavenge pump flow capability matches the HP driven supply pump (oil pump 71) flow. The low-pressure rotor control speed may also be set to avoid low-pressure rotor resonances and may be adjusted to optimize the vibration response during a starting process. When the low-pressure motor torque is reduced to zero as a result of the aerodynamic torque driving the low-pressure shaft above the minimum required speed then the motor-generator 60 can be shut-off from operating in the motor mode (e.g., to be operated in a generator mode). Such an example process may maintain the minimum low-pressure shaft speed to drive the scavenge pump 68 throughout the starting process and allowing a smooth transition to aerodynamic power.

In some examples, motor-generator 60 may control low-pressure shaft 58 to the minimum speed to ensure required oil scavenge capability with scavenge pump 68 during failure or abnormal conditions or during engine maintenance whenever the low-pressure shaft 58 speed otherwise would be inadequate.

Additionally, or alternatively, controller 64 may control motor-generator 60 to operate in a motor mode during starting of engine 140, e.g., during the starting of the HP spool assembly by starter 72, to apply torque to low-pressure shaft 58 in order to overcome cogging torque associated with the motor-generator 60. This may to reduce delay between the starting of low-pressure shaft 58 rotation relative to the starting of the HP shaft 54 rotation by starter 72. In general, the amount of torque applied to the low-pressure shaft 54 by motor-generator 60 may be greater than the amount of cogging torque resisting the rotation of low-pressure shaft 58. The cogging torque resisting the rotation of low-pressure shaft 58 may be torque due to the interaction between the permanent magnets of the rotor and the stator slots of an electric machine such as motor-generator, such as a permanent magnet type electric machine. In some examples, such cogging torque may be referred to as "no-current torque". This would enable earlier initial rotation of the low-pressure shaft/rotor 58 with minimum applied power to enable the low-pressure shaft/rotor 58 to turn sooner. In such an example, the motor-generator 60, under the control of controller 64 using motor/generator inverter 62, may apply the predicted cogging torque and friction torque based on design calculations and verified by test.

Additionally, or alternatively, controller 64, using motor/generator inverter 62, may control motor-generator 60 to operate in a motor mode before starting of engine 18A, e.g., before the starting of the HP spool assembly by starter 72, to apply torque to low-pressure shaft 58 in order to check for rotor lock without attempting a start of engine 18A or, particularly, attempting a start of the HP spool assembly. For example, controller 64, using motor/generator inverter 62, may control motor-generator 60 to apply a static torque at a level that avoids overstress of a rotor (such as a low-pressure shaft 58) in a case in which the rotor is locked. Upon applying the static torque, controller 64 may determine whether or not the applied torque resulted in the rotation of low-pressure shaft 58 based on the output of a low-pressure shaft/rotor speed sensor, and, thus, determine whether or not the low-pressure shaft 58 is locked. If the rotor is determined to be locked, controller 60 may abort or prevent a starting attempt using starter 72 until the possible detected rotor lock is resolved. If the rotor is determined to be rotatable and not locked, controller 60 may proceed with starting the HP spool assembly using starter 72. The level of static torque capable of being applied by motor-generator 60 may be less than the amount of torque applied by starter 72 during starting of the HP spool assembly and, thus, may be less likely to damage engine 18A in the case of a locked rotor.

FIG. 4B is a schematic functional diagram illustrating example gas turbine engine system 218A. Gas turbine engine system 218A may be an example of engine 18A in FIG. 1. System 218A may be similar to system 118A of FIG. 4A, and like features are similarly numbered. System 218A may operate like that described above for system 118A in FIG. 4A. However, system 218A is an example of a turboprop system compared to a turboshaft system like the example of FIG. 4A. In the example of FIG. 4B, system 218A includes a propeller gearbox (PGB) 152 that allows low-pressure shaft 58 to rotationally drive the rotation of propeller shaft 154. Although not shown, propeller shaft 154 may drive the rotation of one or more propellers, e.g., for propulsion. In such an example, scavenge pump 68 and motor-generator 60, when in generator mode, may be driven by the rotation of low-pressure shaft 68 via PGB 152. In motor mode, motor-generator 60 may drive low-pressure shaft 58 and/or scavenge pump 68 via PGB 152.

Figure 5:
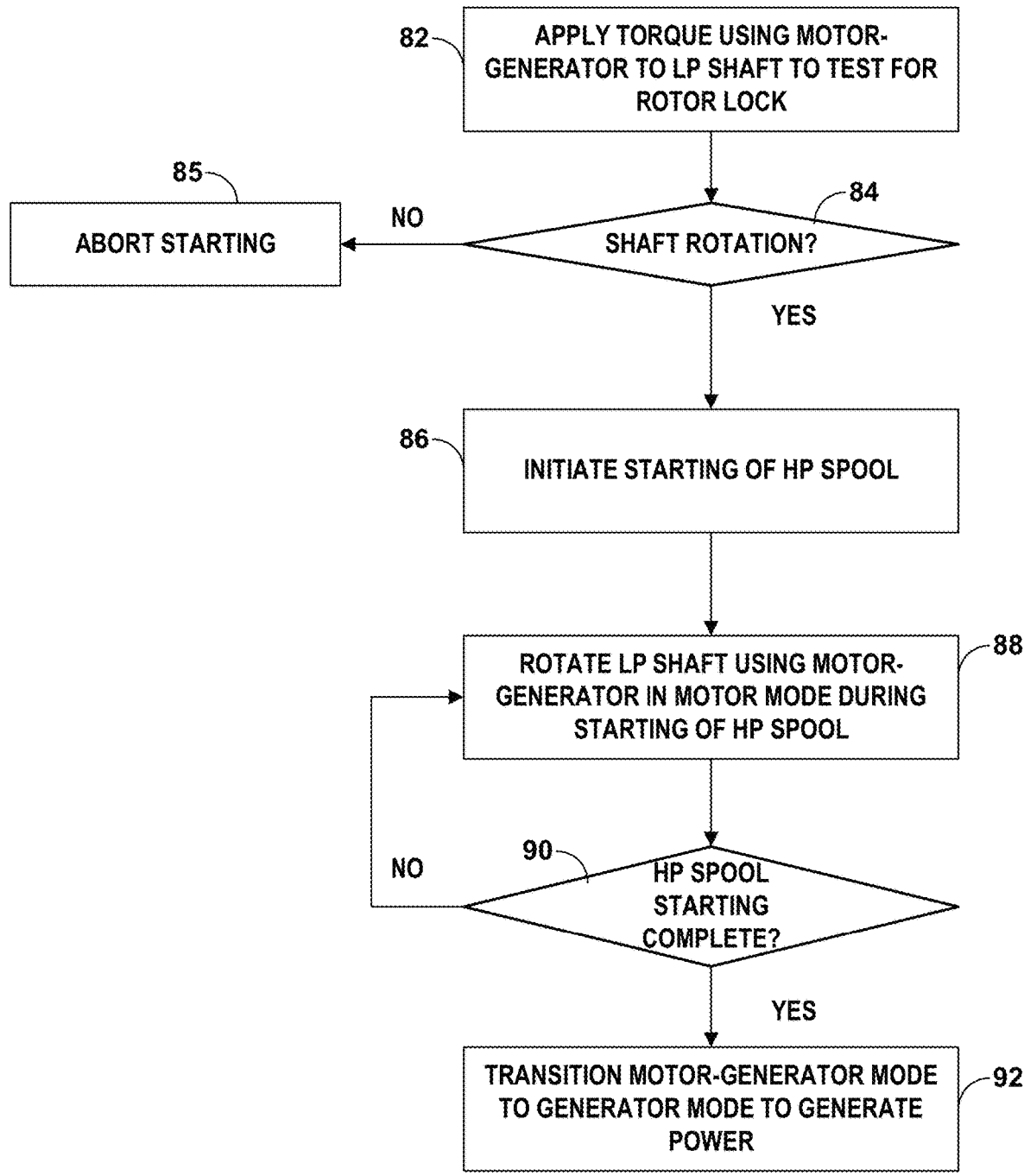
FIG. 5 is a flow diagram illustrating an example technique for operating a gas turbine engine system in accordance with examples of the disclosure.

FIG. 5 is a flow diagram illustrating an example technique for starting a gas turbine engine in accordance with examples of the disclosure. For ease of description, the example technique of FIG. 5 is described with respect to engine system 118A show in FIG. 3A, although any suitable system may implement the example technique of FIG. 5.

As shown in FIG. 5, prior to starting of engine system 118A (e.g., when HP shaft 54 and low-pressure shaft 58 are both not rotating), controller 64 optionally controls, using motor/generator inverter 62, motor-generator 60 to apply a relatively low amount of torque to low-pressure shaft 58 to test for rotor lock, e.g., as described above (82). The amount of torque applied by motor-generator 60 may be high enough to rotate low-pressure shaft 58 if low-pressure shaft 58 but low enough to not cause undesired damage to low-pressure shaft 58 or other components of the low-pressure spool and/or engine system 118A more generally if the low-pressure rotor system has seized or locked (e.g., due to binding or interference of the low-pressure turbine rotor blades and the low-pressure turbine case due to thermal soak back effects that could allow the case to cool and shrink while the rotor and blades are still hot for example). The torque applied by motor-generator 60 to check for rotor lock may be continuously applied and applied in short pulses to break the low-pressure shaft 58 free or may be applied for only a discrete period of time that is long enough to rotate low-pressure shaft 58 for the cases where low-pressure shaft 58 is not in rotor lock.

Figure 3B:
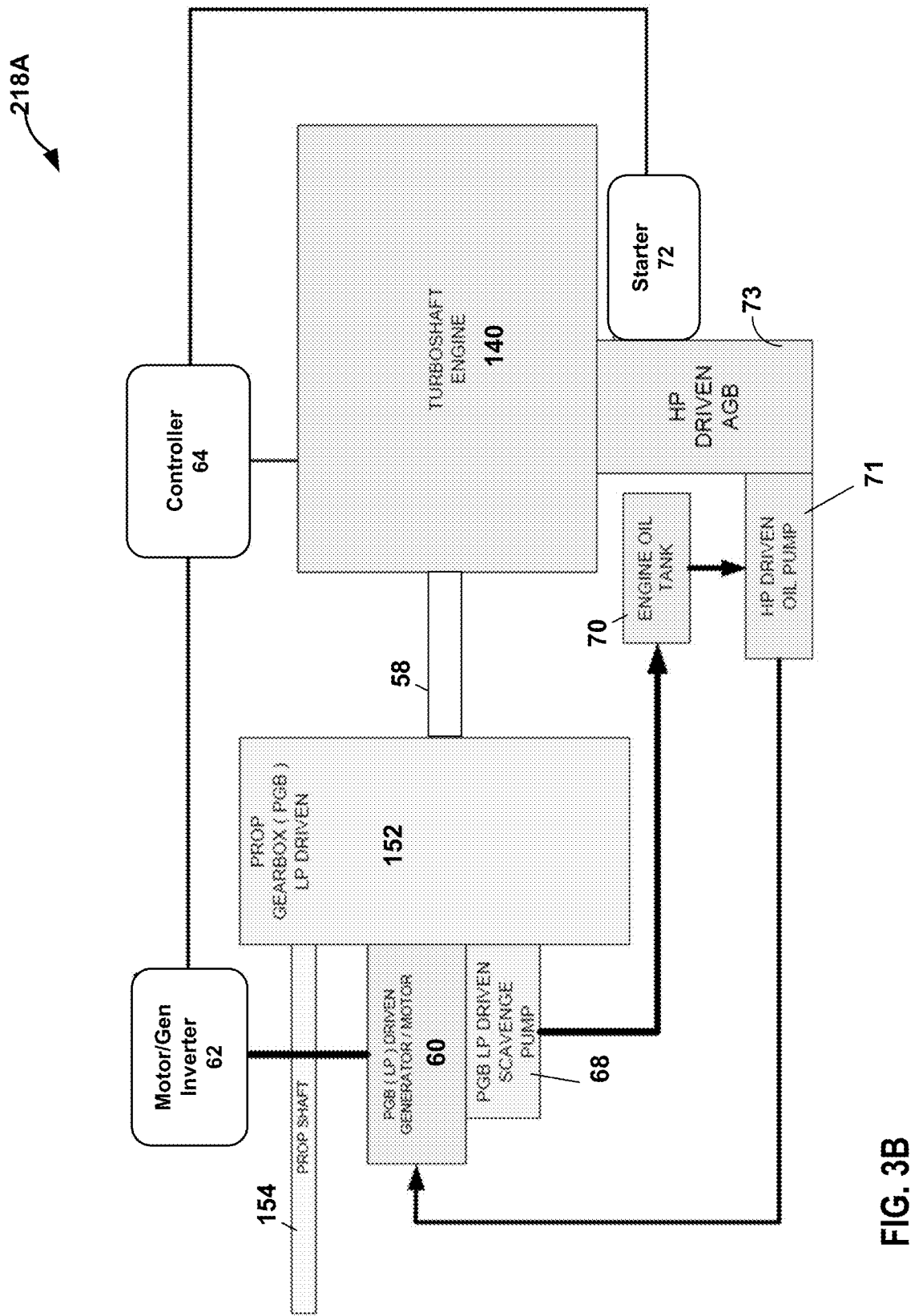

After applying the torque via motor-generator 60 in a motor mode, controller 64 may determine if low-pressure shaft 58 rotates in response to the applied torque (84). Controller 64 may detect the rotation using any suitable technique such as using one or more sensors (not shown in FIG. 3) configured to sense the rotation of low-pressure shaft 58. If controller 64 determines that low-pressure shaft 58 did not rotate in response to the applied torque, then controller 64 may abort the starting attempt for system 118A (85). In some examples, controller 64 may generate an alert (e.g., via a user interface display) that indicates the starting attempt was aborted due to detection of a possible rotor lock for system 118A.

Conversely, if controller 64 determines that low-pressure shaft 58 rotated in response to the applied torque, controller 64 may initiate the starting of the HP spool assembly (86). For example, controller 64 may control starter 72 to apply a torque to HP shaft 54 to rotate HP shaft 54 as part of the process for starting of the HP spool assembly described above.

As shown in FIG. 5, during the starting of the HP spool assembly, controller 64, using motor/generator inverter 62, may also control motor-generator 60 to apply a torque to low-pressure shaft 54 to rotate low-pressure shaft 54 (88). In some examples, controller 64 may also control motor-generator 60 to apply a torque to low-pressure shaft 54 to initiate rotation of low-pressure shaft 54 (e.g., in instances in which low-pressure shaft 58 is no longer rotating from the applied torque for the rotor lock test or in cases in which a rotor lock test is not carried out beforehand). In other examples, controller 64, using motor/generator inverter 62, may also control motor-generator 60 to apply a torque to low-pressure shaft 54 to continue the rotation of low-pressure shaft 58 following the rotor lock test.

Accordingly, in some examples, motor-generator 60 may apply torque to low-pressure shaft 54 in conjunction with the starting of the HP shaft 54 by starter 72 in a manner that causes low-pressure shaft 54 to be rotating when HP shaft 54 begins being rotated as part of the starting process (e.g., where T(1) is after T(2) in the plot of FIG. 4). In other examples, under the control of controller 64, motor-generator 60 may apply torque to low-pressure shaft 54 in conjunction with the starting of the HP shaft 54 by starter 72 in a manner that causes low-pressure shaft 54 begin rotating when HP shaft 54 begins being rotated as part of the starting process (e.g., where T(1) is at substantially the same time as T(2) in the plot of FIG. 4). In other examples, under the control of controller 64, motor-generator 60 may apply torque to low-pressure shaft 54 in conjunction with the starting of the HP shaft 54 by starter 72 in a manner that causes low-pressure shaft 54 begin rotating after HP shaft 54 begins being rotated as part of the starting process but before low-pressure shaft 58 would begin rotating absent the application of torque applied by motor-generator 60 (e.g., where T(1) is before T(2) but T(2) is before T(3) in the plot of FIG. 4).

Motor-generator 60 may apply a torque to low-pressure shaft 58 during all or a portion of the time during the starting of the HP spool assembly. In some examples, motor-generator 60 may apply a torque to initiate the starting of rotation and then continue to apply the torque to accelerate/decelerate the rotation of low-pressure shaft 58 as desired during the starting the HP spool assembly. In some examples, motor-generator 60 may apply an amount of torque that overcomes the cogging torque of motor-generator 60 to begin the rotation of low-pressure shaft 58, after which time the rotation may be driven by turbine 40, e.g., where the application of torque to overcome cogging torque is substantially coincident with low-pressure shaft 58 being capable of being driven by turbine 40.

In some examples, controller 64, using motor/generator inverter 62, may control motor-generator 60 to selectively apply a torque to accelerate and/or decelerate the rotational speed of low-pressure shaft. For example, as described further below, during the starting of the HP spool assembly, controller 64, using motor/generator inverter 62, may control motor-generator 60 to selectively apply a torque to accelerate and/or decelerate low-pressure shaft 58 when shaft 58 is rotating at an undesirable rate of rotation (e.g., rpm). This may allow for the engine 18A to quickly traverse through particular rates of rotation for low-pressure shaft 58. The undesirable rotational rates for low-pressure shaft 58 more correspond to rates or ranges of rates that engine 18A is likely to experience or does experience undesirable effects from the rotation of low-pressure shaft 58, e.g., as manifested by undesired vibrations of engine 18A. Additionally, or alternatively, controller 64, using motor/generator inverter 62, may operate motor-generator 60 in such a manner following the starting of the HP spool assembly, e.g., to more rapidly traverse low-pressure shaft 58 through RPM values or ranges of values that are undesirable, e.g., those associated with "no-dwell zones" or undesired vibration of engine 18A. The transit time through the RPM values or ranges of values that are undesirable may be increased (e.g., by applying an accelerating or decelerating torque with motor-generator 60 used in the motor mode) compared to an operation in which low-pressure shaft 58 is driven by turbine 40 without being assisted by motor-generator 60.

In the example of FIG. 5, controller 64 determines when the HP spool assembly starting is complete (90), e.g., when the HP shaft 54 rotation is driven by turbine 38. As shown, motor-generator 60 may continue to apply a torque to rotate low-pressure shaft 58 until the starting of the HP spool assembly is complete. Once the starting of the HP spool assembly is complete, controller 64, using motor/generator inverter 62, may transition motor-generator 60 from a motor mode to a generator mode (92). For example, controller 64, using motor/generator inverter 62, may control motor-generator to stop applying torque to low-pressure shaft 58 to rotate shaft 58 (e.g., by either abruptly terminating the applied torque or over a period of time to more slowly ramp down the applied torque), and then employ motor-generator 60 to generate electricity from the rotation of low-pressure shaft 58, e.g., as driven by turbine 40 of the low-pressure spool assembly. The power generator by motor-generator 60 in the generator mode may be used to supply power to various aircraft systems (e.g., electrical systems of the vehicle system that require electrical energy to operate).

In some examples, during the process of FIG. 5, as the HP rotor speed increases the aerodynamic torque for the low-pressure rotor increases rapidly. Controller 64, using inverter 62, may control the operation of motor-generator 60 to achieve a low-pressure rotor speed minimum. Such operation may allow the motor torque and power applied by motor-generator 60 to be gradually decreased as the aerodynamic torque takes over while ensuring a minimum LP rotor speed is maintained. When the LP motor torque decreases to zero, then controller shuts off the application of torque by motor-generator 60, e.g., to initiate the operation of motor-generator 60 in generator mode.

Figure 6:
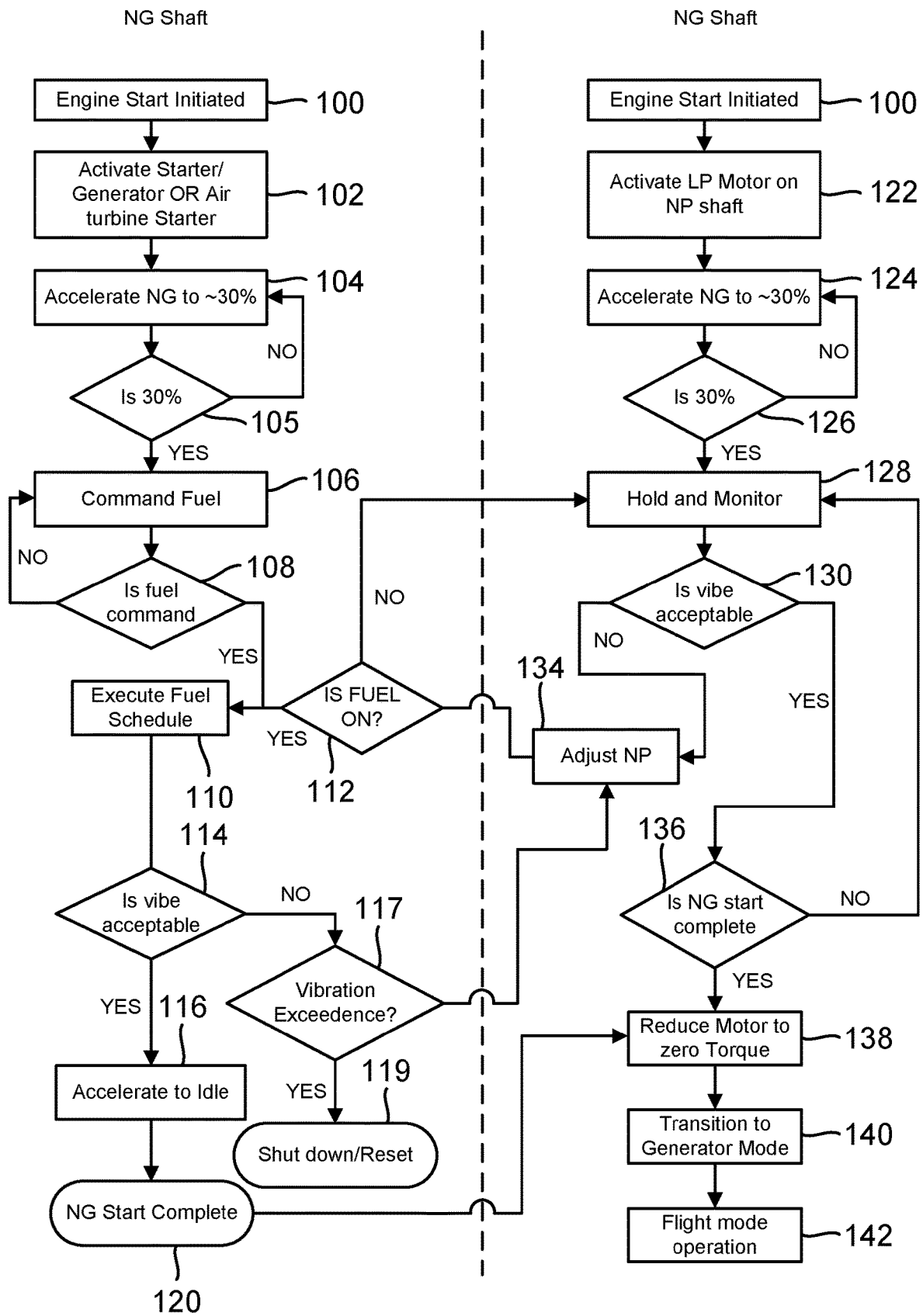
FIG. 6 is a flow diagram illustrating another example technique for operating a gas turbine engine system in accordance with examples of the disclosure.

FIG. 6 is a flow diagram illustrating another example technique for starting a gas turbine engine in accordance with examples of the disclosure. For ease of description, the example technique of FIG. 6 is described with respect to engine system 118A show in FIG. 3A, although any suitable system may implement the example technique of FIG. 6. For purposes of illustration, the flow diagram includes the process carried out from the perspective of HP shaft 54 ("NG Shaft" in FIG. 6) and the perspective of lower pressure shaft ("NP Shaft" in FIG. 6).

As shown, upon initiating the starting of engine 18A (100), controller 64 may activate starter 72 in the form of a starter/generator or air turbine starter (102). Starter 72 may apply a torque or otherwise accelerate HP shaft 54 to about 30% of the max rated speed of 100% (or some other desired RPM) (104). Controller 64 may determine if HP shaft is at about 30% (105). If not, starter 72 may continue to accelerate HP shaft to about 30%.

When the rotational speed of HP shaft 54 reaches about 30%, then controller 64 may command fuel (106). Once the fuel command is complete (108), controller 64 may execute a fuel schedule (110). Following the executed fuel schedule, controller 64 if the vibration of the LP shaft/rotor 58 is acceptable (114). If the vibration is not acceptable, then controller determines the vibration exceedance (117). If vibration exceedance is present, then controller 64 shuts down the starting process and may attempt a restart (119). If there is no exceedance, then controller 64 may adjust (e.g., increase) the rotational speed of the low-pressure shaft 58, e.g., using motor-generator 60 to adjust the speed of low-pressure shaft 58 by the application of torque. The final schedule may then be re-executed, and if the vibration and MGT are acceptable, controller may accelerate the HP spool assembly to idle (116) and complete the starting (120).

With regard to low-pressure (NP) shaft 58 during the starting of HP (NG) shaft 54, following the initiation of the starting of engine 18A (100), controller 64 may activate the operation of motor-generator 60 on the low-pressure shaft (122) and, by applying torque to low-pressure (NP) shaft 58, motor-generator 60 may accelerate low-pressure (NP) shaft 58 to about 30% of 100% of the maximum engine rated speed (or some other desired RPM) (124). Controller 64 monitors the RPM of low-pressure shaft 58 (126) and, upon reaching the desired RPM, holds low-pressure shaft 58 at the rotational speed with motor-generator 60 and monitors engine or motor vibrations with accelerometers (128). Controller 64 may then determine whether or not the vibration is acceptable based on the vibration of the engine or motor as sensed by accelerometers that may be placed to monitor LP rotor vibration (130). If the vibration is not acceptable, controller 64, using inverter 62, may adjust the rotational speed of low-pressure (NP) shaft 58 using motor-generator 60 to accelerate or decelerate the rotation of low-pressure (NP) shaft 58 (134) and then determine if the fuel is on (112). If the fuel is on, then the fuel schedule is executed (110) or, if the fuel is not on, return to hold and monitor (128). If the vibration is acceptable, controller 64 may continue to hold the low-pressure (NP) shaft 58 at the rotational speed as driven by the motor-generator 60 (132) until the starting of the HP (NG) spool is complete (136). Once the start is complete and the engine reaches idle, controller 64 may reduce the torque applied by motor-generator to zero (138) and transition to operating motor-generator 60 in a generator mode, e.g., to generate electricity from the rotation of low-pressure shaft 58 driven by turbine 40 (140). Controller 64 may then initiate flight sequences (142).

Figure 7:
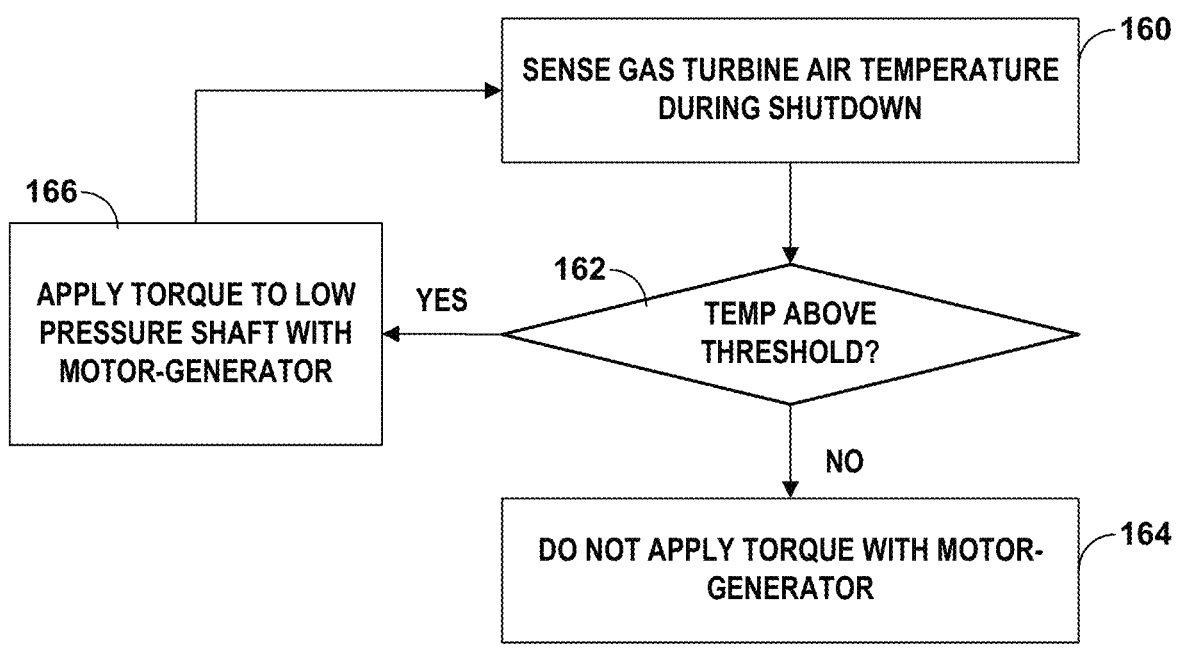
FIG. 7 is a flow diagram illustrating another example technique for operating a gas turbine engine system in accordance with examples of the disclosure.

FIG. 7 is a flow diagram illustrating an example technique for operating a gas turbine engine during shutdown in accordance with examples of the disclosure. For ease of description, the example technique of FIG. 7 is described with respect to engine system 18A shown in FIG. 2B, although any suitable system may implement the example technique of FIG. 7, including those other example engine systems described herein.

As shown in FIG. 7, upon initiating the shutdown of engine system 118A (e.g., from idle), controller 64, using one or more suitable temperature sensors, may sense the gas turbine gas flow path air temperature (160). Controller 64 then determines whether the temperature of the air in the turbine section is greater than a threshold temperature (162). The threshold value may be a preprogrammed temperature. If the temperature is greater than the threshold value, controller 64, using inverter 62, may operate motor-generator 60 in a motor mode to apply a torque to low-pressure shaft 58, e.g., to rotate fan 28 via rotation of low-pressure shaft 58, during the engine spool down (166). The applied torque rotates the LP turbine to promote air flow through the engine. This operation may purge hot air from engine system 18A to reduce the cooldown time during shutdown. Controller 64, using inverter 62, may continue to operate the motor-generator 60 to rotate low-pressure shaft 58 a until the sensed air temperature is equal to or below the threshold value, at which time the controller terminates the application of the torque by motor-generator 60 (164). Alternatively, controller 60 may continue to operate the motor-generator to rotate low-pressure shaft 58 for a preset period of time (e.g., 1 to 2 minutes) at which time the controller terminates the application of the torque by motor-generator 60 (164).

Additionally, or alternatively, engine system 18A may be configured such that controller 64 applies a torque to low-pressure shaft 58 by motor-generator 60 to clear a fire and/or fuel vapor from one or more turbines of the engine, such as, low-pressure turbine 40 and/or HP turbine 38. This operation may be initiated upon sensing of a fire and/or relatively high levels of fuel vapor at one or more locations of engine 18A.

Although examples of the disclosure are described primarily with regard to the low-pressure spool assembly of engine 18A including a motor-generator operably connected to the shaft system of the spool, it is contemplated that such an arrangement may additionally, or alternatively be employed for an intermediate pressure (IP) spool in an engine including three or more spools. For example, in the case of an engine such as engine 18A that includes an HP spool, an IP spool, and a low-pressure spool, the engine may include a motor-generator coupled to the low-pressure spool shaft, a motor generator coupled to the IP spool shaft, or both. Regardless of the particular spool, the motor-generator(s) for the IP spool and the low-pressure spool may be operated in the manner described herein.

Various examples have been described. These and other examples are within the scope of the following clauses and claims.

Clause 1. A gas turbine engine system comprising: a high-pressure (HP) spool assembly including a HP shaft, a HP compressor, and HP turbine; a lower pressure (LP) spool assembly including a LP shaft and a LP turbine; a motor-generator coupled to the LP shaft; and a controller configured to: control the motor-generator to operate in a motor mode to apply torque to the LP shaft during starting of the HP spool assembly, and control the motor-generator to operate in a generator mode for a least a period of time following the starting of the HP spool assembly.

Clause 2. The system of clause 1, wherein the torque applied to the LP shaft during the starting of the HP spool assembly by the motor-generator is configured to begin rotating the LP shaft at substantially the same time as the HP shaft begins rotating during the starting of the HP spool assembly.

Clause 3. The system of clause 1 or clause 2, further comprising a starter motor coupled to the HP spool assembly, wherein the controller is configured to control the starter motor to start the HP spool assembly by applying torque to the HP shaft, wherein the motor-generator is configured to apply the torque to the LP shaft while the starter motor applies torque to the HP shaft.

Clause 4. The system of any one of clauses 1-3, wherein, prior to the starting of the HP spool assembly, the controller is configured to apply a static torque of a magnitude LP shaft to the LP shaft to determine if the LP shaft is locked prior to starting the HP spool assembly, and wherein the magnitude is selected to avoid damage to the LP shaft when the LP shaft is locked.

Clause 5. The system of clause 4, wherein the controller is configured to abort the starting of the HP spool assembly upon determining that the LP shaft is locked.

Clause 6. The system any one of clauses 1-5, further comprising an oil scavenge pump driven by rotation of the LP shaft, wherein the controller is configured to control the motor-generator to operate in the motor mode to apply the torque to the LP shaft during the starting of the HP spool assembly to cause oil to recirculate to an oil tank, and wherein the recirculated oil is supplied an oil pump driven by the HP shaft assembly.

Clause 7. The system of clause 6, wherein the controller is configured to control the LP shaft to rotate at a minimum LP speed required to operate a LP scavenge pump at a speed at which scavenge oil flows during at least one of engine starting or engine shutdown.

Clause 8. The system of clause 6, wherein the controller is configured to control the LP shaft to rotate at a minimum LP speed required to operate a LP scavenge pump at a speed at which scavenge oil flows during at least one of failure cases or abnormal conditions or during engine maintenance.

Clause 9. The system of any one of clauses 1-8, wherein the torque applied by the motor-generator to the LP shaft during a starting of the HP spool assembly is configured to overcome a cogging torque of the motor-generator.

Clause 10. The system of any one of clauses 1-9, further comprising a sensor configured to sense a vibration of the LP shaft during operation of the motor-generator in the motor mode, wherein the controller is configured to adjust the torque applied to the LP shaft by the motor-generator during the starting of the HP spool assembly based on the sensed vibration.

Clause 11. The system of any one of clauses 1-10, wherein the controller is configured to transition the operation of the motor-generator from the motor mode to the generator mode using an inverter following the starting of the HP spool assembly.

Clause 12. The system of any one of clauses 1-11, wherein the controller is configured to gradually reduce an amount of torque applied to the LP shaft by the motor-generator as HP rotor aerodynamic torque increases during the starting of the HP spool assembly.

Clause 13. The system of any one of clauses 1-12, wherein the controller is configured to: determine an air temperature in a turbine section is above a threshold temperature during shutdown of the gas turbine engine system; and control the motor-generator to operate in the motor mode to apply torque to the LP shaft to rotate the LP turbine, wherein the rotation of the LP turbine increases air flow through the turbine section.

Clause 14. The system of any one of clauses 1-13, wherein the controller is configured to: determine at least one of unwanted fuel vapors or fuel accumulation in the engine is possible during engine starting or shutdown; and control the motor-generator to operate in the motor mode to apply torque to the LP shaft to rotate the LP turbine based on the determination, wherein the rotation of the LP turbine increases air flow through the engine to purge the at least one of fuel vapors or fuel.

Clause 15. A method for operating a gas turbine engine system, the engine system comprising a high-pressure (HP) spool assembly including a HP shaft, a HP compressor and HP turbine; a lower pressure (LP) spool assembly including a LP shaft and a LP turbine; a motor-generator coupled to the LP shaft; and a controller, the method comprising: controlling the motor-generator to operate in a motor mode to apply torque to the LP shaft during starting of the HP spool assembly, and controlling the motor-generator to operate in a generator mode for a least a period of time following the starting of the HP spool assembly.

Clause 16. The method of clause 15, wherein the torque applied to the LP shaft during the starting of the HP spool assembly by the motor-generator is configured to begin rotating the LP shaft at substantially the same time as the HP shaft begins rotating during the starting of the HP spool assembly.

Clause 17. The method of clause 15 or clause 16, wherein the engine system comprises a starter motor coupled to the HP spool assembly, the method further comprising controlling the starter motor to start the HP spool assembly by applying torque to the HP shaft while the torque is applied to the LP shaft by the motor-generator.

Clause 18. The method of any one of clauses 15-17, further comprising, prior to the starting of the HP spool assembly, controlling the motor-generator to apply a static torque of a magnitude LP shaft to the LP shaft to determine if the LP shaft is locked prior to starting the HP spool assembly, wherein the magnitude is selected to avoid damage to the LP shaft when the LP shaft is locked.

Clause 19. The method of clause 18, further comprising aborting the starting of the HP spool assembly upon determining that the LP shaft is locked.

Clause 20. The method of any one of clauses 15-119, wherein the engine system comprises an oil scavenge pump driven by rotation of the LP shaft, wherein controlling the motor-generator to operate in the motor mode to apply torque to the LP shaft during starting of the HP spool assembly comprises controlling the motor-generator to operate in the motor mode to apply the torque to the LP shaft during the starting of the HP spool assembly to cause oil to recirculate to an oil tank, and wherein the recirculated oil is supplied an oil pump driven by the HP shaft assembly.

Clause 21. The method of clause 20, further comprising controlling the LP shaft to rotate at a minimum LP speed required to operate a LP scavenge pump at a speed at which scavenge oil flows during at least one of engine starting or engine shutdown.

Clause 22. The method of clause 20, further comprising controlling the LP shaft to rotate at a minimum LP speed required to operate a LP scavenge pump at a speed at which scavenge oil flows during at least one of failure cases or abnormal conditions or during engine maintenance.

Clause 23. The method of any one of clauses 15-22, wherein the torque applied by the motor-generator to the LP shaft during a starting of the HP spool assembly is configured to overcome a cogging torque of the motor-generator.

Clause 24. The method of any one of clauses 15-23, wherein the engine system comprises a sensor configured to sense a vibration of the LP shaft during operation of the motor-generator in the motor mode, the method further comprising adjusting the torque applied to the LP shaft by the motor-generator during the starting of the HP spool assembly based on the sensed vibration.

Clause 25. The method of any one of clauses 15-24, further comprising transition the operation of the motor-generator from the motor mode to the generator mode following the starting of the HP spool assembly.

Clause 26. The method of any one of clauses 15-25, further comprising gradually reducing an amount of torque applied to the LP shaft by the motor-generator as HP rotor aerodynamic torque increases during the starting of the HP spool assembly.

Clause 27. The method of any one of clauses 15-26, further comprising: determining an air temperature in a turbine section is above a threshold temperature during shutdown of the gas turbine engine system; and controlling the motor-generator to operate in the motor mode to apply torque to the LP shaft to rotate the LP turbine, wherein the rotation of the LP turbine increases air flow through the turbine section.

Clause 28. The method of any one of clauses 15-27, further comprising: determining at least one of unwanted fuel vapors or fuel accumulation in the engine is possible during engine starting or shutdown; and controlling the motor-generator to operate in the motor mode to apply torque to the LP shaft to rotate the LP turbine based on the determination, wherein the rotation of the LP turbine increases air flow through the engine to purge the at least one of fuel vapors or fuel.

What is claimed is:

1. A gas turbine engine system comprising:
a high-pressure (HP) spool assembly including a HP shaft, a HP compressor, and HP turbine;
a lower pressure (LP) spool assembly including a LP shaft and a LP turbine;
a motor-generator coupled to the LP shaft; and
a controller configured to:
prior to the starting of the HP spool assembly, apply a static torque of a magnitude to the LP shaft to determine if the LP shaft is locked prior to starting the HP spool assembly, and wherein the magnitude is selected to avoid damage to the LP shaft if the LP shaft is locked;
control the motor-generator to operate in a motor mode to apply torque to the LP shaft during starting of the HP spool assembly, and
control the motor-generator to operate in a generator mode for at least at period of time following the starting of the HP spool assembly.

2. The system of claim 1, further comprising a starter motor coupled to the HP spool assembly, wherein the controller is configured to control the starter motor to start the HP spool assembly by applying torque to the HP shaft, wherein the motor-generator is configured to apply the torque to the LP shaft while the starter motor applies torque to the HP shaft.

3. The system of claim 1, wherein the controller is configured to abort the starting of the HP spool assembly upon determining that the LP shaft is locked.

4. The system of claim 1, further comprising an oil scavenge pump driven by rotation of the LP shaft, wherein the controller is configured to control the motor-generator to operate in the motor mode to apply the torque to the LP shaft during the starting of the HP spool assembly to cause oil to recirculate to an oil tank, and wherein the recirculated oil is supplied an oil pump driven by the HP shaft assembly.

5. The system of claim 1, wherein the controller is configured to control the LP shaft to rotate at a minimum LP speed to operate an oil scavenge pump at a speed at which scavenge oil flows during at least one of engine starting or engine shutdown.

6. The system of claim 1, wherein the controller is configured to control the LP shaft to rotate at a minimum LP speed to operate an oil scavenge pump at a speed at which scavenge oil flows during at least one of failure cases or during engine maintenance.

7. The system of claim 1, wherein the torque applied by the motor-generator to the LP shaft during a starting of the HP spool assembly is configured to overcome a cogging torque of the motor-generator.

8. A method for operating a gas turbine engine system, wherein the gas turbine engine system comprises a high-pressure (HP) spool assembly including a HP shaft, a HP compressor and HP turbine; a lower pressure (LP) spool assembly including a LP shaft and a LP turbine; a motor-generator coupled to the LP shaft; and a controller, the method comprising:
prior to the starting of the HP spool assembly, controlling the motor-generator to apply a static torque of a magnitude to the LP shaft to determine if the LP shaft is locked prior to starting the HP spool assembly, wherein the magnitude is selected to avoid damage to the LP shaft if the LP shaft is locked;
controlling the motor-generator to operate in a motor mode to apply torque to the LP shaft during starting of the HP spool assembly, and
controlling the motor-generator to operate in a generator mode for at least a period of time following the starting of the HP spool assembly.

9. The method of claim 8, wherein the engine system comprises a starter motor coupled to the HP spool assembly, the method further comprising controlling the starter motor to start the HP spool assembly by applying torque to the HP shaft while the torque is applied to the LP shaft by the motor-generator.

10. The method of claim 8, further comprising aborting the starting of the HP spool assembly upon determining that the LP shaft is locked.

11. The method of claim 8, wherein the engine system comprises an oil scavenge pump driven by rotation of the LP shaft, wherein controlling the motor-generator to operate in the motor mode to apply torque to the LP shaft during starting of the HP spool assembly comprises controlling the motor-generator to operate in the motor mode to apply the torque to the LP shaft during the starting of the HP spool assembly to cause oil to recirculate to an oil tank, and wherein the recirculated oil is supplied an oil pump driven by the HP shaft assembly.

12. The method of claim 8, further comprising controlling the LP shaft to rotate at a minimum LP speed to operate an oil scavenge pump at a speed at which scavenge oil flows during at least one of engine starting or engine shutdown.

13. The method of claim 8, further comprising controlling the LP shaft to rotate at a minimum LP speed to operate an oil scavenge pump at a speed at which scavenge oil flows during at least one of failure cases or abnormal conditions or during engine maintenance.

14. The method of claim 8, wherein the torque applied by the motor-generator to the LP shaft during a starting of the HP spool assembly is configured to overcome a cogging torque of the motor-generator.

\* \* \* \* \*